US008576504B2

(12) United States Patent
Akada

(10) Patent No.: US 8,576,504 B2
(45) Date of Patent: Nov. 5, 2013

(54) MOTOR DRIVING APPARATUS AND OPTICAL APPARATUS

(75) Inventor: Hiroshi Akada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/216,652

(22) Filed: Aug. 24, 2011

(65) Prior Publication Data

US 2012/0050897 A1 Mar. 1, 2012

(30) Foreign Application Priority Data

Aug. 30, 2010 (JP) ................................ 2010-192651

(51) Int. Cl.
*G02B 7/02* (2006.01)

(52) U.S. Cl.
USPC ........................... 359/824; 359/822; 359/823

(58) Field of Classification Search
USPC ................................ 359/676, 694, 822–824
See application file for complete search history.

(56) References Cited

U.S. PATENT DOCUMENTS

| | | | | |
|---|---|---|---|---|
| 6,232,700 | B1 * | 5/2001 | Kosaka et al. | 310/323.17 |
| 7,777,968 | B2 * | 8/2010 | Sugiura | 359/697 |
| 2003/0123889 | A1 * | 7/2003 | Isobe et al. | 399/27 |
| 2011/0176229 | A1 * | 7/2011 | Saito | 359/824 |

FOREIGN PATENT DOCUMENTS

| | | |
|---|---|---|
| JP | 60-028800 | 2/1985 |
| JP | 11044899 A * | 2/1999 |

* cited by examiner

*Primary Examiner* — Mahidere Sahle
(74) *Attorney, Agent, or Firm* — Cowan, Liebowitz & Latman, P.C.

(57) ABSTRACT

The motor driving apparatus includes a motor driving a driven member, and a controller performing, from a start of driving of the motor, acceleration drive of the motor on the basis of a predetermined acceleration pattern with open-loop control, and then perform, in response to increase of a driving speed of the motor or the driven member to a predetermined speed, drive of the motor with feedback control. The controller changes the predetermined acceleration pattern and the predetermined speed depending on a magnitude of a load acting on the motor or the driven member.

13 Claims, 11 Drawing Sheets

205 205c 205b 401d 401b 403 205a 203 401 401a 401c 202b 406 406a 406c 406b 406d 406e 405b 405 202 202a 405a 404 402d 204 206b 206c 402b 402c 402 402a 206 206a

MOTOR DRIVING APPARATUS AND OPTICAL APPARATUS

BACKGROUND OF THE INVENTION

1. Field of the Invention

The present invention relates to a motor driving apparatus that controls drive of a motor, and particularly to a motor driving apparatus including a sensor for detecting a position of a rotor.

2. Description of the Related Art

A method for providing good drive control of a stepping motor in a wide speed range has been proposed which performs open-loop control in a low driving speed range and performs feedback control in a high driving speed range.

FIG. 13 shows a conventional control method being performed by combining the open-loop control and the feedback control. In FIG. 13, a horizontal axis shows time, and a vertical axis shows rotational speed of the motor or driving speed of a driven member that is driven by the motor. The rotational speed of the motor and the driving speed of the driven member are hereinafter collectively referred to as a "driving speed"). A period $tp_1$ and a period $tp_2$ are acceleration periods, a period $tp_3$ is a constant speed period where a constant speed Vcm is maintained, and a period $tp_4$ and a period $tp_5$ are deceleration periods. Moreover, the period $tp_1$ is the acceleration period in the open-loop control, the period $tp_2$ is the acceleration period in the feedback control, the period $tp_4$ is the deceleration period in the feedback control, and the period $tp_5$ is the deceleration period in the open-loop control. In addition, a point $Pc_1$ is a switching point from the open-loop control to the feedback control, and a point $Pc_2$ is a switching point from the feedback control to the open-loop control.

During acceleration, the open-loop control increases the driving speed to a predetermined speed $Vc_1$, and then is switched to the feedback control. On the other hand, during deceleration, the feedback control decreases the driving speed to a predetermined speed $Vc_2$, and then is switched to the open-loop control. The predetermined speeds $Vc_1$ and $Vc_2$ are set lower than a speed at which the stepping motor loses steps.

Japanese Patent Laid-Open No. 60-28800 discloses a control method that retrieves an acceleration/deceleration pattern to be used, from a memory, according to a driving step number (rotation amount) of a stepping motor, the memory prestoring plural acceleration/deceleration patterns.

However, in the control method shown in FIG. 13 and the control method disclosed in Japanese Patent Laid-Open No. 60-28800, the acceleration pattern used in the acceleration period $tp_1$ where the open-loop control is performed is decided to one pattern regardless of a magnitude of a load acting on the motor in that period $tp_1$. Therefore, a speed increase rate in the acceleration pattern (a slope of the graph shown FIG. 13) is set low so as to be able to drive the motor without losing steps even in a state where a supposed maximum load acts on the motor. In other words, even though a low load allows a high speed increase rate in the acceleration pattern, a low speed increase rate is always set.

Moreover, the point $Pc_1$ shown in FIG. 13 where the open-loop control is switched to the feedback control is decided to one point, a low speed increase rate in the acceleration pattern needs a long time until the driving speed increases up to the driving speed (switching speed) $Vc_1$. Thus, a start timing of high-speed drive of the motor with the feedback control is delayed.

SUMMARY OF THE INVENTION

The present invention provides a motor driving apparatus capable of appropriately setting the acceleration pattern in the open-loop control and the switching speed at which the open-loop control is switched to the feedback control, depending on the magnitude of the load acting on the motor, and provides an optical apparatus with the same.

The present invention provides as one aspect thereof a motor driving apparatus including a motor configured to drive a driven member, and a controller configured to perform, from a start of driving of the motor, acceleration drive of the motor on the basis of a predetermined acceleration pattern with open-loop control, and then perform, in response to increase of a driving speed of the motor or the driven member to a predetermined speed, drive of the motor with feedback control. The controller is configured to change the predetermined acceleration pattern and the predetermined speed depending on a magnitude of a load acting on the motor or the driven member.

The present invention provides as another aspect thereof an optical apparatus including the above-described motor driving apparatus, and a lens barrel as the driven member.

Further features and aspects of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Embodiment 1

Figure 1:
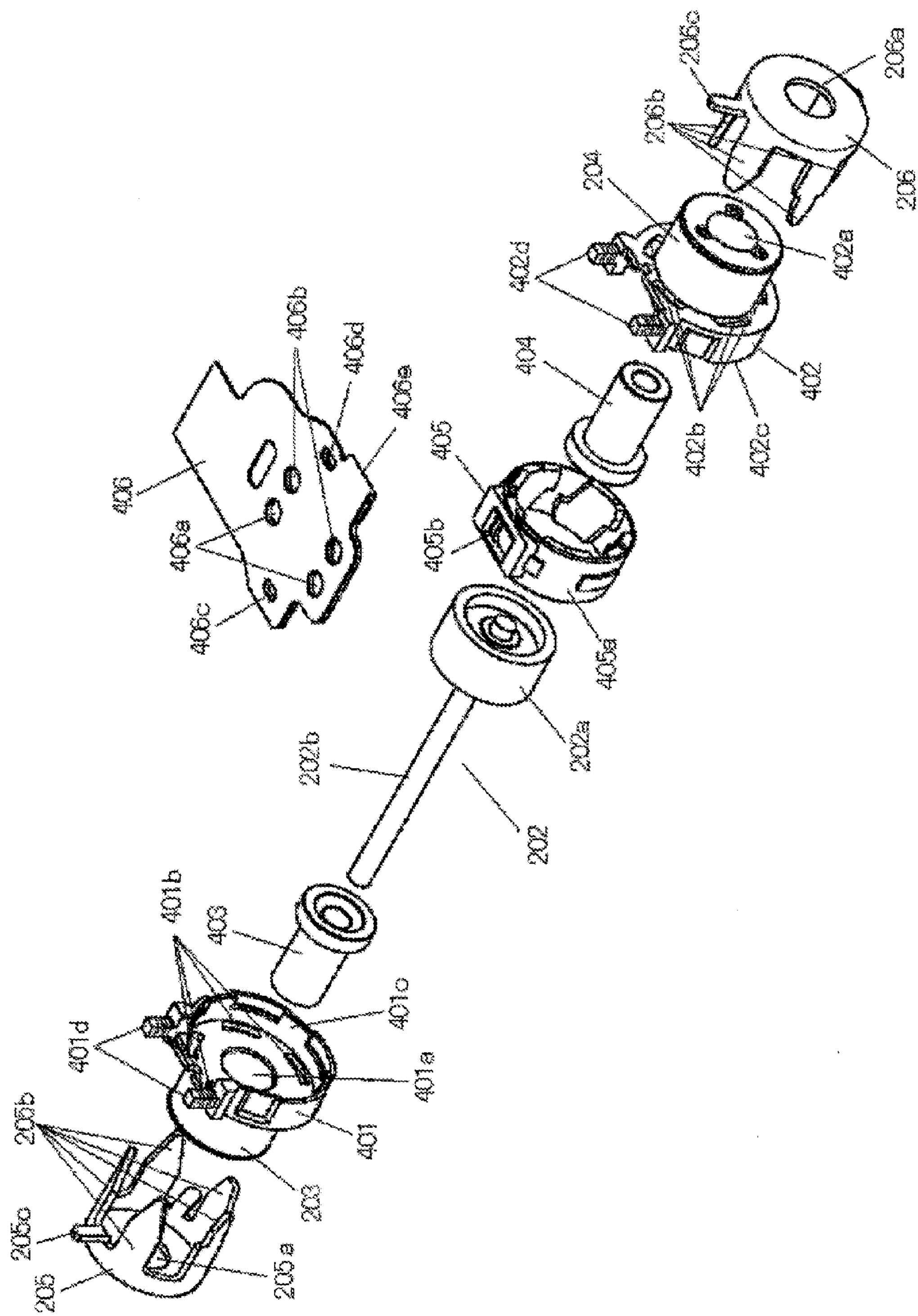
FIG. 1 is an exploded perspective view of a motor to be used for a motor driving apparatus that is Embodiment 1 of the present invention.

FIG. 1 shows an exploded view of a stepping motor (hereinafter simply referred to as a "motor") 101 to be used in a motor driving apparatus 1 that is a first embodiment (Embodiment 1) of the present invention. The motor 101 includes a rotor 202 constituted by a magnet 202*a* and a shaft 202*b*, and a first bearing 403 and a second bearing 404 that rotatably support the shaft 202*b*. The magnet 202*a* is a cylindrical permanent magnet whose outer circumferential surface (magnet face) is magnetized so as to form plural magnetic poles, and has a magnetization pattern in which magnetic strength in its radial direction changes in a sine wave manner according to its circumferential position (rotational direction position).

Moreover, the motor 101 includes a bobbin 401 formed of a non-conductive material, a first coil 203 wounded around the bobbin 401, a bobbin 402 formed of the non-conductive material, and a second coil 204 wounded around the bobbin 402. Furthermore, the motor 101 includes a first yoke 205 and a second yoke 206 that are formed of a magnetic steel sheet, and a ring member 405 that positions the bobbins 401 and 402. In addition, the motor 101 includes a flexible printed circuit board 406 through which the first and second coils 203 and 204 are energized. At two places around the rotor 202 on the flexible printed circuit board 406, position detection elements 407 (shown in FIG. 11) respectively included in their packages a first position sensor 207 and a second position sensor 208 shown in FIG. 2.

The rotor 202 is supported by the first bearing 404 at its long shaft portion and by the second bearing 403 at its short shaft portion. These first and second bearings 403 and 404 are respectively inserted into and pass through hole portions 401*a* and 402*a* of the bobbins 401 and 402 (that is, inner circumferential portions of the first and second coils 203 and 204). In addition, outer circumferential portions of the first and second bearings 403 and 404 are respectively pressed into hole portions 205*a* and 206*a* formed in the first and second yokes 205 and 206 to be fixed thereto. Teeth portions 205*b* and 206*b* of the first and second yokes 205 and 206 are respectively inserted into and pass through hole portions 401*b* and 402*b* formed in the bobbins 401 and 402.

Thus, the bobbin 401 including the first coil 203, the first yoke 205 and the first bearing 403 are mutually integrated, and the bobbin 402 including the second coil 204, the second yoke 206 and the second bearing 404 are mutually integrated.

Inner circumferential portions 401*c* and 402*c* of the bobbins 401 and 402 are radially fitted to an outer circumferential portion 405*a* of the ring member 405. Tips of the teeth portions 205*b* and 206*b* of the first and second yokes 205 and 206 are arranged so as to face the magnet face of the rotor 202.

Terminal portions 401*d* and 402*d* provided in the bobbins 401 and 402 are respectively inserted into and pass through hole portions 406*a* and 406*b* formed in the flexible printed circuit board 406. Winding ends of the first and second coils 203 and 204 are wounded on the terminal portions 401*d* and 402*d*.

Moreover, protrusion portions 205*c* and 206*c* formed in the first and second yokes 205 and 206 are respectively inserted into and pass through the hole portions 406*c* and 406*d*.

Figure 10:
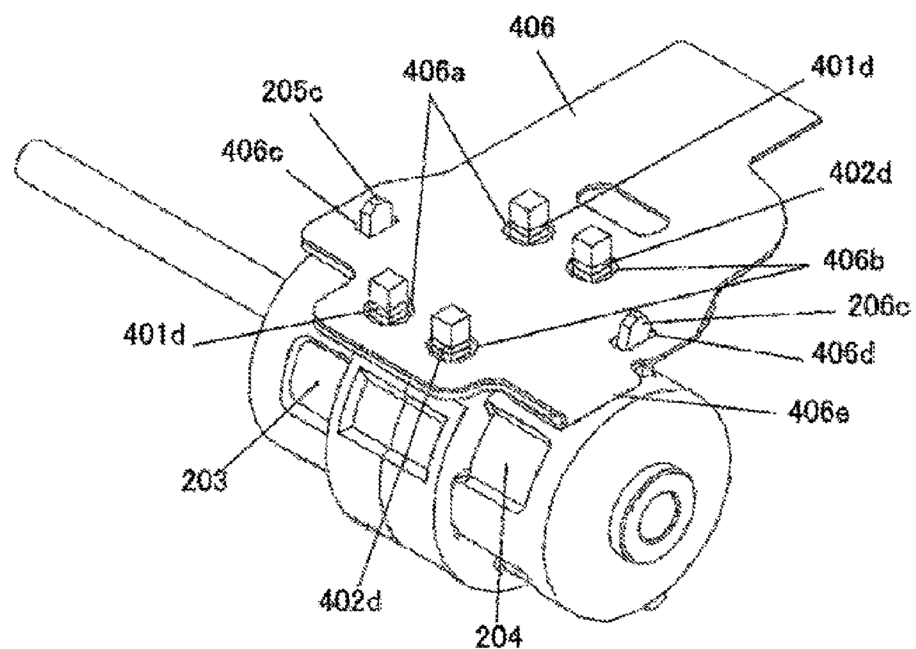
FIG. 10 is an external view of the motor to which a flexible printed circuit board has been attached, in Embodiment 1.

FIG. 10 shows the motor 101 and the flexible printed circuit board 406 assembled with each other. The terminal portions 401*d* and 402*d* and the protrusion portions 205*c* and 206*c* inserted into and passing through the hole portions 406*a*-406*d* in the flexible printed circuit board 406 are soldered to the flexible printed circuit board 406. Thereby, the flexible printed circuit board 406 is electrically connected with the winding ends of the first and second coils 203 and 204 wounded on the terminal portions 401*d* and 402*d*. Moreover, the flexible printed circuit board 406 is fixed to the protrusion portions 205*c* and 206*c* of the first and second yokes 205 and 206.

Figure 11:
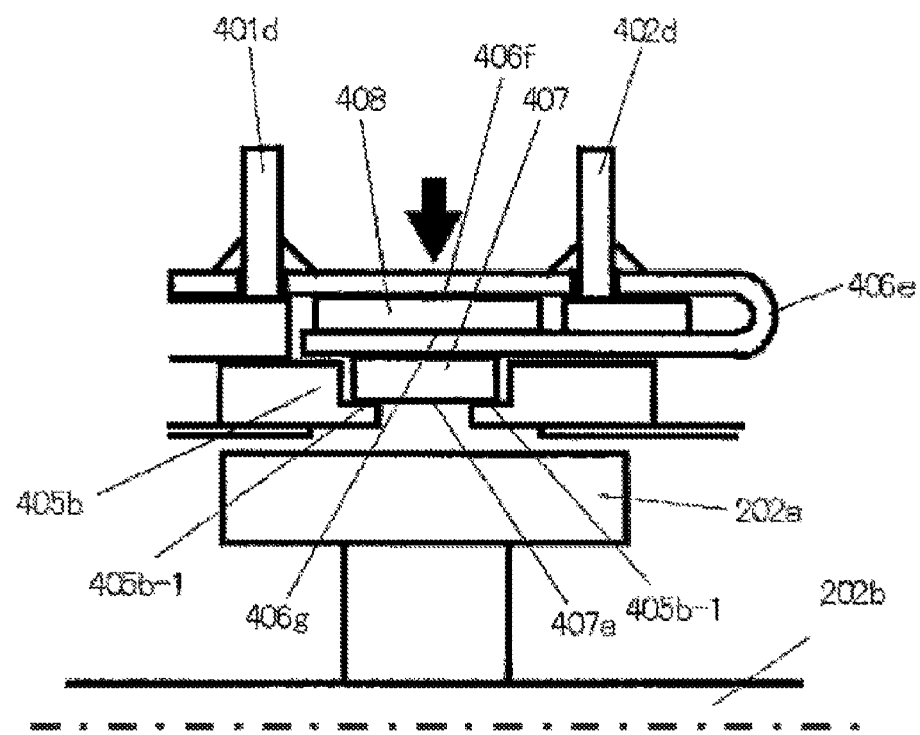
FIG. 11 is a cross-sectional view of the motor to which the flexible printed circuit board has been attached, in Embodiment 1.

The above-mentioned position detection elements 407 are mounted on a bent portion 406*e* formed in the flexible printed circuit board 406. The position detection elements 407 are disposed in a recess portion 405*b* formed in the ring member 405 such that sensor faces of the position detection elements 407 face the magnet face of the rotor 202 as shown in FIG. 11. A package face 407*a* of each position detection element 407 is in contact with a bottom face 405*b*-1 of the recess portion 405*b*.

An elastic member 408 is disposed between a board face (opposite face to the soldered face) 406*f* located between the terminal portions 401*d* and 402*d* on the flexible printed circuit board 406 and a board face 406*g* of the bent portion 406*e* opposite to the face on which the position detection elements 407 are mounted. In other words, the position detection elements 407, the board face 406*f*, the board face 406*g* and the elastic member 408 are stacked in an area between the terminal portions 401*d* and 402*d*. The terminal portions 401*d* and 402*d* are soldered to the flexible printed circuit board 406 in a state where a pressure is applied to the elastic member 408 in a direction shown by an arrow in FIG. 11 to compress the elastic member 408. Thereby, an elastic restoring force of the elastic member 408 brings the package face 407*a* of each position detection element 407 into press contact with the bottom face of the recess portion 405*b* formed in the ring member 405. Thus, the position detection elements 407 are positioned with respect to the recess portion 405*b* of the ring member 405, which prevents displacement of the position detection elements 407 after the soldering.

The positioning and displacement prevention of the position detection elements 407 with respect to the recess portion 405*b* makes it possible to suppress output variation of the position sensors 207 and 208 at respective rotational positions of the rotor 202, which enables accurate detection of the rotational position of the rotor 202.

Figure 2:
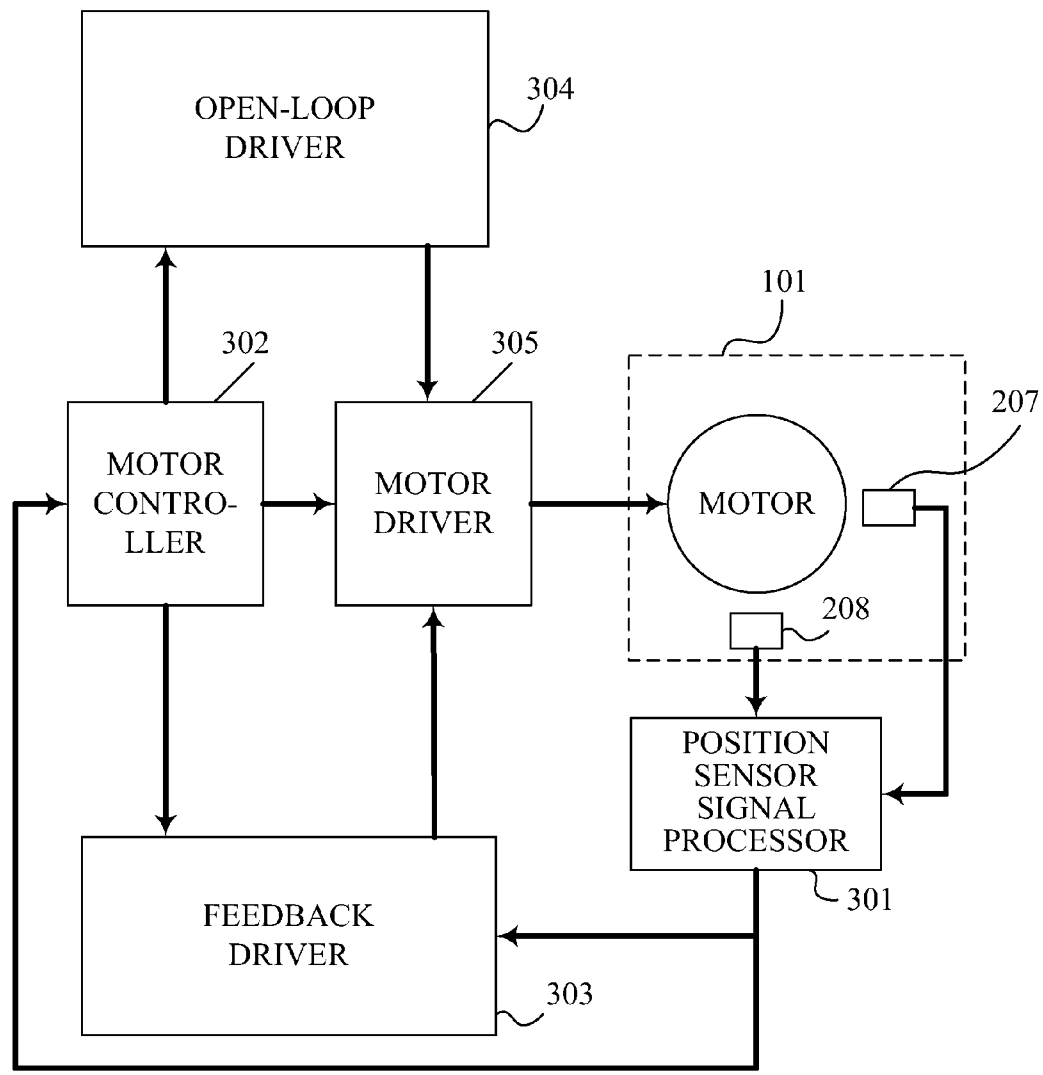
FIG. 2 is a block diagram showing the configuration of a driving circuit installed in the motor driving apparatus of Embodiment 1.

FIG. 2 shows the configuration of the motor driving apparatus 1. The motor driving apparatus 1 includes the above-described motor 101, a position sensor signal processor 301 that processes outputs of the position sensors 207 and 208 included in the motor 101, and a motor controller 302 that selectively performs feedback control and open-loop control.

Moreover, the motor driving apparatus 1 includes a feedback driver 303 that drives the motor 101 with the feedback control, and an open-loop driver 304 that drives the motor 101 with the open-loop control. The feedback driver 303 and the open-loop driver 304 respectively produce motor driving signals for the feedback control and the open-loop control to output them to the motor driver 305. The motor driver 305 energizes the first and second coils 203 and 204 of the motor 101 in response to input of the motor driving signals.

The motor controller 302, the feedback driver 303 and the open-loop driver 304 and the motor driver 305 constitute a controller.

Next, description will be made of the drive of the motor 101 with the open-loop control. The drive of the motor 101 with the open-loop control is hereinafter referred to as "OP drive".

The open-loop driver 304 performs the OP drive of the motor 101 through the motor driver 305. The OP drive is a driving method that switches an energization state of the first and second coils 203 and 204 at a predetermined time interval. Specifically, the open-loop driver 304 sequentially switches the energization state of the first and second coils 203 and 204 according to a driving pulse interval (driving frequency) and a rotational direction that are instructed from the motor controller 302. This OP drive rotates the rotor 202 in the instructed rotational direction at a rotational speed corresponding to the instructed driving frequency. This is also referred to as "OP speed control". Moreover, the open-loop driver 304 switches the energization state of the first and second coils 203 and 204 so as to rotate the rotor 202 by an angle corresponding to a driving pulse number instructed by the motor controller 302. This is also referred to as "OP position control".

The OP drive thus switching the energization state of the first and second coils 203 and 204 at the driving pulse interval (predetermined time interval) can control timings of the switching of the energization state without receiving an influence of detection results of the position detection elements 407. However, a fast driving speed of the motor 101 (that is, a short driving pulse interval) makes the rotor 202 impossible to respond to the switching of the energization state, which may cause the motor 101 to lose steps. This causes necessity of providing a limit to a shortest driving pulse interval, which restricts high-speed drive of the motor 101.

Next, description will be made of the drive of the motor 101 with the feedback control. The drive of the motor 101 with the feedback control is hereinafter referred to as "FB drive".

The feedback driver 303 performs the FB drive of the motor 101 through the motor driver 305. The FB drive is a driving method that switches the energization state of the first and second coils 203 and 204 according to the outputs (detection signals) of the position detection elements 407 (position sensors 207 and 208). Specifically, the feedback driver 303 sequentially switches the energization state of the first and second coils 203 and 204 according to the driving pulse number and rotational direction that are instructed by the motor controller 302 and according to lead angle signals produced from the detection signals of the position detection elements 407. This FB drive rotates the rotor 202 by an angle corresponding to the instructed driving pulse number in the instructed rotational direction. This is also referred to as "FB position control".

Moreover, controlling current values or voltage values applied to the first and second coils 203 and 204 enables the rotor 202 to rotate with a torque corresponding to the current value or the voltage value. This is also referred to as "FB current/voltage control". In addition, controlling a phase difference (lead angle) between the detection signal from each position detection element 407 and the above-mentioned lead angle signal enables change of a torque-rotational speed characteristic of the motor 101. This is also referred to as "FB lead angle control", which will be described later.

The FB drive thus switching the energization state of the first and the second coils 203 and 204 according to the output of the position detection elements 407 switches the energization state in accordance with the rotational positions of the rotor 202. This can suppress the rotor 202 from losing steps due to delay in response, which makes it possible to perform high-speed drive of the motor 101.

Figure 3:
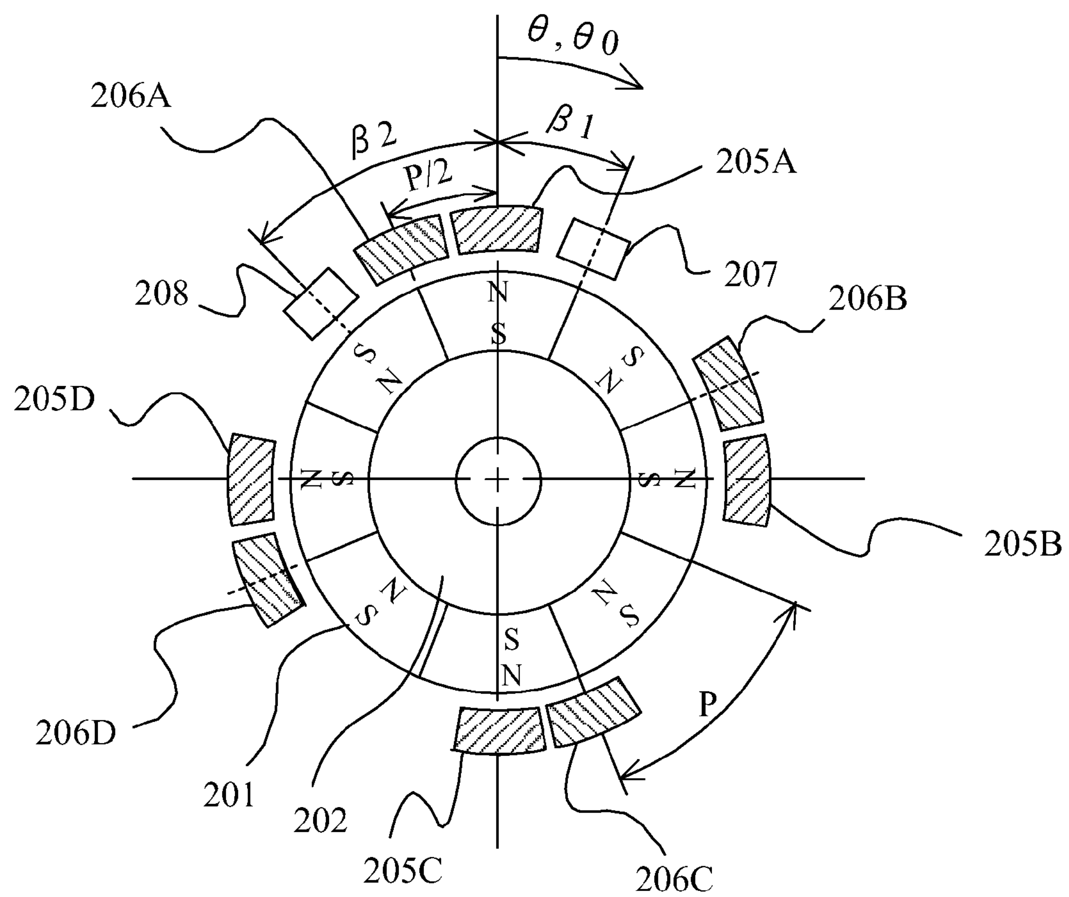
FIG. 3 is a cross-sectional view showing a phase relationship among a yoke, position sensors and a rotor in Embodiment 1, when viewed in an axis direction of the motor.

Next, description will be made of a phase relationship between the first and second yokes 205 and 206 and the position sensors 207 and 208 with reference to FIG. 3. A clockwise direction in FIG. 3 is defined as a positive direction. Reference numerals 205A, 205B, 205C and 205D denote the teeth of the first yoke 205 forming magnetic poles, which are shown by reference numeral 205*b* in FIG. 1. Reference numerals 206A, 206B, 206C and 206D denote the teeth of the second yoke 206 forming magnetic poles, which are shown by reference numeral 206*b* in FIG. 1. In this embodiment, the number of the magnetic poles is eight, and a magnetizing angle P is 45°. Moreover, with reference to the first yoke 205, a phase P/2 of the second yoke 206 is −22.5°, a phase β1 of the first position sensor 207 is +22.5°, and a phase β2 of the second position sensor 208 is −45°.

Description will hereinafter be made of operations of the motor 101 by using an electrical angle. The electrical angle is expressed by defining one cycle of a magnetic field generated by the magnet 202*a* of the rotor 202 as 360°. The electrical angle θ is expressed by the following expression where M represents the number of the magnetic poles of the magnet 202*a* and $\theta_0$ represents an actual angle:

$$\theta=\theta_0\times M/2 \quad (1\text{-}1).$$

The phase difference between the first and second yokes 205 and 206, the phase difference between the first and second position sensors 207 and 208 and the phase difference between the first yoke 205 and the first position sensor 207 are all 90° in the electrical angle. FIG. 3 shows a state where centers of the magnetic pole teeth 205A-205D of the first yoke 205 radially face centers of N-poles of the magnet 202*a*. This state is defined as an initial state where the electrical angle is 0°.

Figure 4A:
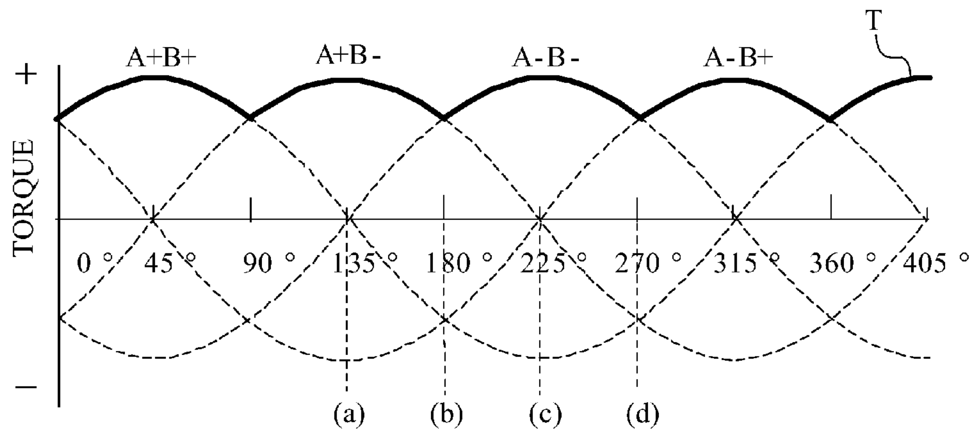
FIG. 4A shows a relationship between rotor position and motor torque in Embodiment 1.

Next, description will be made of a relationship between the rotational position of the rotor 202 in the motor 101 and the torque T of the motor 101 (motor torque), and a relationship between the rotational position of the rotor 202 and respective signal values, with reference to FIGS. 4A and 4B. FIG. 4A shows the relationship between the rotational position (rotational angle) of the rotor 202 and the motor torque. A horizontal axis shows the electrical angle, and a vertical axis shows the motor torque. The motor torque T that rotates the rotor 202 in a clockwise direction is defined as a positive torque.

Applying a positive directional current to the first coil 203 magnetizes the first yoke 205 to form N-poles, which generates an electromagnetic force between the first yoke 205 and the magnetic poles of the magnet 202*a*. Moreover, applying a positive directional current to the second coil 204 magnetizes the second yoke 206 to form N-poles, which generates an electromagnetic force between the second yoke 205 and the magnetic poles of the magnet 202*a*. The two electromagnetic forces are combined to produce a torque shown by a torque curve A+B+, which varies with rotation of the rotor 202 in a sine wave manner. In other energization states, as well as the above energization state, torques shown by torque curves A+B−, A−B− and A−B+, each varying with the rotation of the rotor 202 in the sine wave manner, are produced. Since the first yoke 205 has a phase difference of 90° in the electrical angle with respect to the second yoke 206, the four torques mutually have a phase difference of 90° in the electrical angle.

Figure 4B:
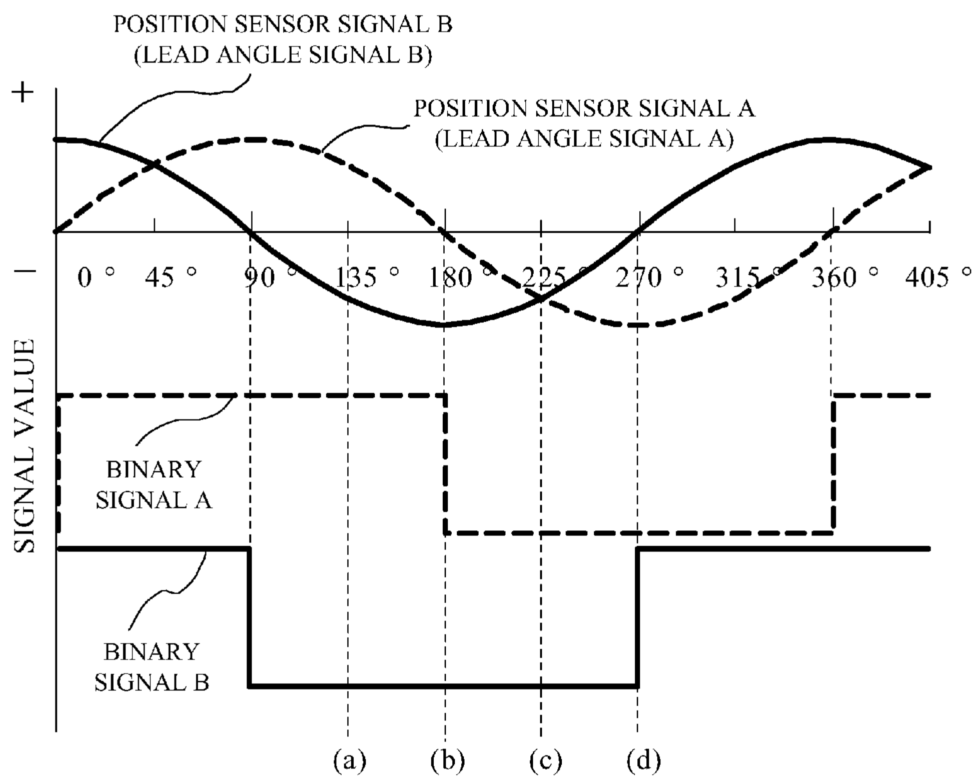
FIG. 4B shows a relationship between the rotor position and respective signal values in Embodiment 1.

FIG. 4B shows the relationship between the rotational position of the rotor 202 and the respective signal values. A horizontal axis shows the electrical angle, and a vertical axis shows the respective signal values. The magnetic strength of the magnet 202*a* in the radial direction varies approximately in a sine wave manner with respect to the electrical angle. Therefore, the first position sensor 207 outputs a position sensor signal A having a sine waveform. In this embodiment, the first position sensor 207 outputs a positive signal value when facing the N-pole of the magnet 202*a*.

Since the second position sensor 208 is disposed to have a phase difference of 90° in the electrical angle with respect to the first position sensor 207, the second position sensor 208 outputs a position sensor signal B having a cosine waveform. In this embodiment, the second position sensor 208 has a polarity reverse to that of the first position sensor 207, so that the second position sensor 208 outputs a positive signal value when facing an S-pole of the magnet 202*a*.

Next, description will be made of a lead angle circuit constituting part of the feedback driver 303. The lead angle circuit performs predetermined calculation on the basis of the outputs of the first and second sensors 207 and 208 that have been processed by the position sensor signal processor 301, and outputs a first lead angle signal and a second lead angle signal each having an arbitrary lead angle set by the motor controller 302.

The output HE1 of the first position sensor 207 and the output HE2 of the second position sensor 208 are expressed as follows where θ represents the electrical angle:

$$HE1=\sin\theta$$

$$HE2=\cos\theta \quad (2\text{-}1).$$

Moreover, when the first lead angel signal advancing by a lead angle α is represented by PS1 and the second lead angel signal advancing by the lead angle α is represented by PS2, PS1 and PS2 are calculated by the following calculation expressions using HE1, HE2 and α:

$$PS1=\sin(\theta+\alpha)=HE1\times\cos\alpha+HE2\times\sin\alpha \quad (3\text{-}1)$$

$$PS2=\cos(\theta+\alpha)=HE2\times\cos\alpha-HE1\times\sin\alpha \quad (3\text{-}2).$$

This embodiment configures the lead angle circuit on the basis of these calculation expressions.

Figure 5:
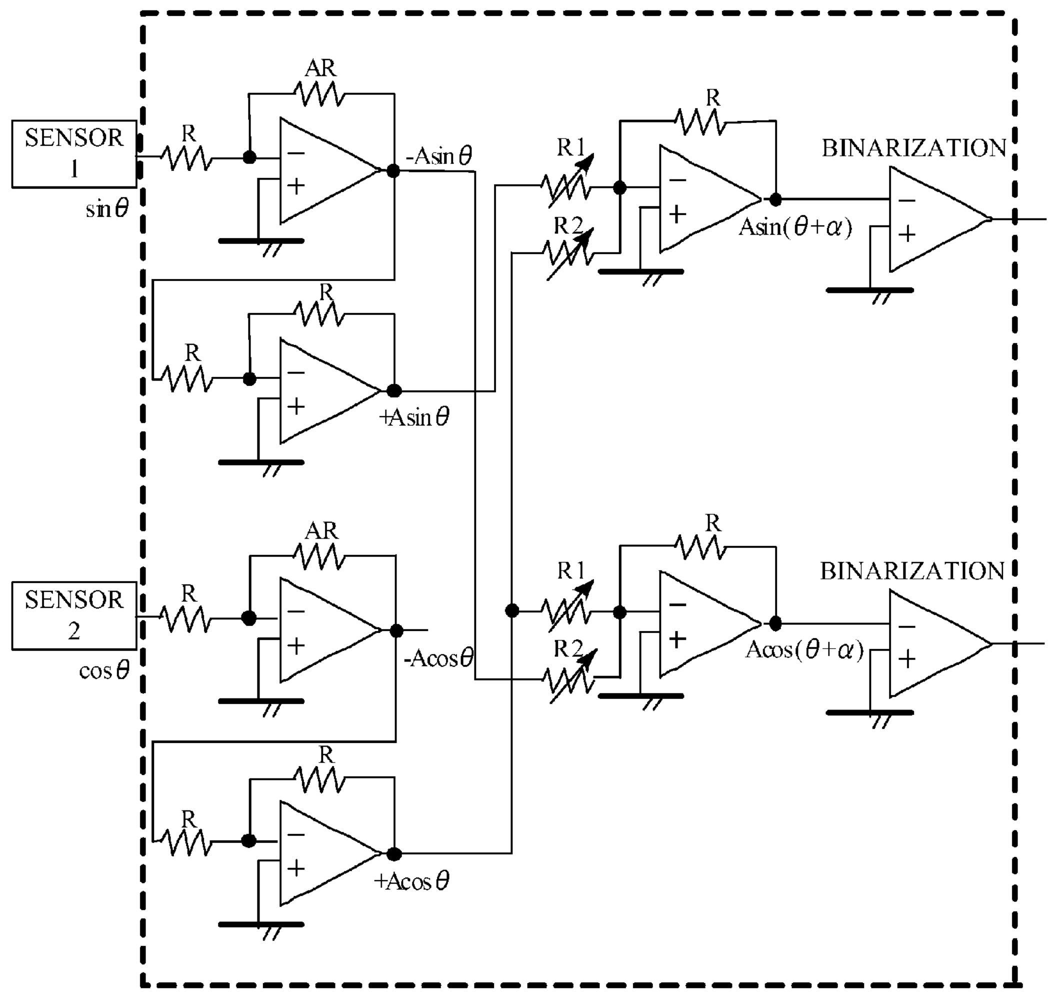
FIG. 5 is a circuit diagram showing the configuration of a lead angle circuit included in the driving circuit.

FIG. 5 shows a configuration example of the lead angle circuit as an analog circuit. The lead angle circuit first produces two signals obtained by amplifying the outputs of the first and second position sensors 207 and 208 at a predetermined amplification factor A and two signals obtained by inverting these signals. The four signals are expressed as A sin θ, A cos θ, −A sin θ and −A cos θ.

Next, the lead angle circuit multiplies these four signals by proper resistance values (variable resistance values) R1 and R2, and then adds the multiplication results to produce the lead angle signals. The first lead angle signal PS1 and the second lead angle signal PS2 are expressed as follows where R represents a variable resistance value:

$$PS1=A\times(R/R1)\sin\theta+A\times(R/R2)\times\cos\theta \quad (4\text{-}1)$$

$$PS2=A\times(R/R1)\cos\theta-A\times(R/R2)\times\sin\theta \quad (4\text{-}2)$$

Selecting the variable resistance values R, R1 and R2 as follows enables production of the lead angle signals advancing by the arbitrary lead angle α.

$$R/R1=\cos\theta$$

$$R/R2=\sin\theta \quad (5\text{-}1)$$

In addition, the lead angle circuit produces binary signals by binarizing the first lead angle signal PS1 and the second lead angle signal PS2 with a comparator, and then outputs the binary signals.

The above-described method of producing the lead angle signals is merely an example. Thus, the lead angle signals may be produced by other methods, such as a method that performs the above-described calculation by a digital circuit, or a method that adjusts pulse interval for switching the energization state by using a high resolution encoder.

Next, description will be made of the switching of the energization state in the FB drive. First, description will be made of operations in the FB drive when the lead angle signals output from the lead angle circuit have a lead angle of 0°.

In FIG. 4B, a lead angle signal A and a lead angle signal B correspond to signals to which a lead angle is given by performing the above-described calculation on the position sensor signal A that is the output of the first position sensor 207 and the position sensor signal B that is the output of the second position sensor 208. In this description, the lead angle is 0, so that the position sensor signal A coincides with the lead angle signal A and the position sensor signal B coincides with the lead angle signal B. A binary signal A and a binary signal B are signals obtained by respectively binarizing the lead angle signal A and the lead angle signal B with comparators.

The FB drive switches the energization state of the first coil 203 on the basis of the binary signal A, and switches the energization state of the second coil 204 on the basis of the binary signal B. That is, the FB drive applies the positive directional current to the first coil 203 when the binary signal A has a positive value, and applies a negative directional (reverse directional) current to the first coil 203 when the binary signal A has a negative value. Moreover, the FB drive applies a positive directional current to the second coil 204 when the binary signal B has a positive value, and applies a negative directional current to the second coil 204 when the binary signal B has a negative value.

Figure 6A:
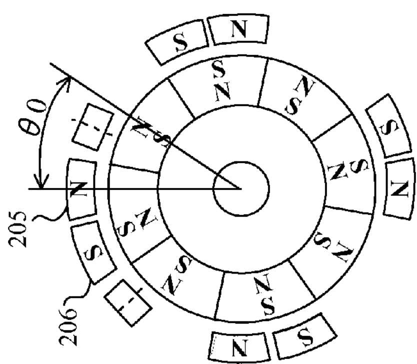
FIGS. 6A to 6F are cross-sectional views of the motor that is driven with FB drive performed by the driving circuit, when viewed in the axis direction of the motor.

FIGS. 6A to 6F show states of the motor 101 in the FB drive. FIG. 6A shows a state where the rotor 202 is rotated from the initial state by an electrical angle of 135°. In this state, the lead angle signals A and B have values shown at (a) in FIG. 4B, the binary signal A has a positive value, and the binary signal B has a negative value. Therefore, the positive directional current is applied to the first coil 203, and thereby the first yoke 205 is magnetized to the N-pole. On the other hand, the negative directional current is applied to the second coil 204, and thereby the second yoke 206 is magnetized to the S-pole. Thus, as shown at (a) in FIG. 4A, a positive torque shown by the torque curve A+B− acts on the rotor 202, and thereby the rotor 202 is rotated in a clockwise direction in FIG. 6A.

Figure 6B:
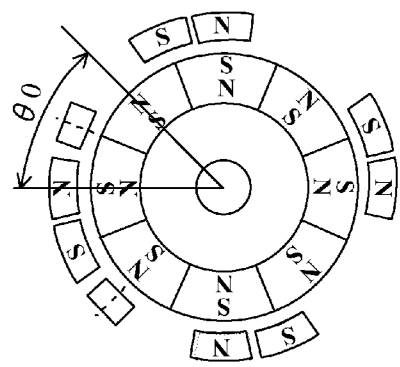

FIG. 6B shows a state where the rotor 202 is rotated from the initial state by an electrical angle of 180°. In this state, the first position sensor 207 is located at a boundary between the N-pole and the S-pole of the magnet 202*a*. Thus, as shown at (b) in FIG. 4B, at the electrical angle of 180°, the value of the binary signal A changes from a positive value to a negative value, and a current application direction for the first coil 203 is switched from the positive direction to the negative direction. This electrical angle coincides with that at an intersection of the torque curve A+B− and the torque curve A−B−.

Figure 6C:
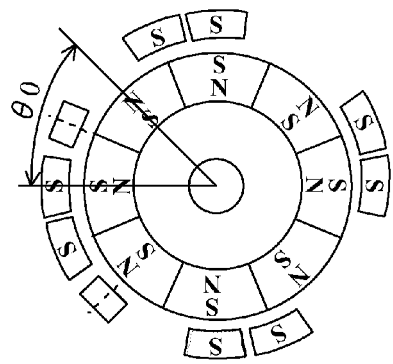

FIG. 6C shows a state after the current application direction for the first coil 203 is switched at a same rotational position of the rotor 202 as that shown in FIG. 6B. The negative directional current is applied to the first coil 203, and thereby the first yoke 205 is magnetized to the S-pole. Also, the negative directional current is applied to the second coil 204, and thereby the second yoke 206 is magnetized to the S-pole. Thus, as shown at (b) in FIG. 4A, a positive torque shown by the torque curve A−B− acts on the rotor 202, and thereby the rotor 202 is rotated in the clockwise direction in FIG. 6C.

Figure 6D:
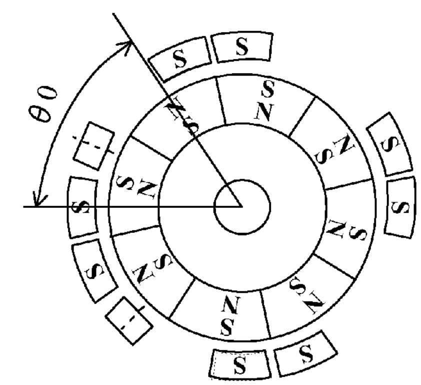

FIG. 6D shows a state where the rotor 202 is rotated from the initial state by an electrical angle of 225°. The lead angle signals A and B have values shown at (c) of FIG. 4B, the binary signal A has a negative value, and the binary signal B also has a negative value. Therefore, the negative directional current is applied to the first coil 203, and thereby the first yoke 205 is magnetized to the S-pole. Also, the negative directional current is applied to the second coil 204, and thereby the second yoke 206 is magnetized to the S-pole. Thus, as shown at (c) in FIG. 4A, a positive torque shown by the torque curve A−B− acts on the rotor 202, and thereby the rotor 202 is rotated in the clockwise direction in FIG. 6D.

Figure 6E:
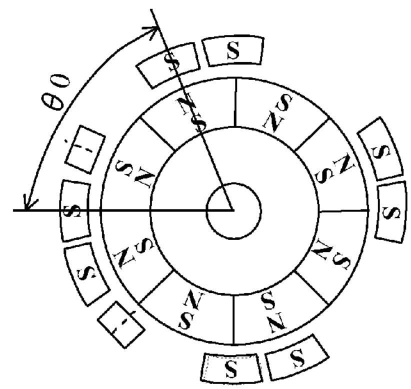

FIG. 6E shows a state where the rotor 202 is rotated from the initial state by an electrical angle of 270°. In this state, the second position sensor 208 is located at the boundary between the N-pole and the S-pole of the magnet 202*a*. Thus, at the electrical angle of 270°, the value of the binary signal B changes from a negative value to a positive value, and a current application direction for the second coil 204 is switched from the negative direction to the positive direction. This electrical angle coincides with that at an intersection of the torque curve A−B− and the torque curve A−B+.

Figure 6F:
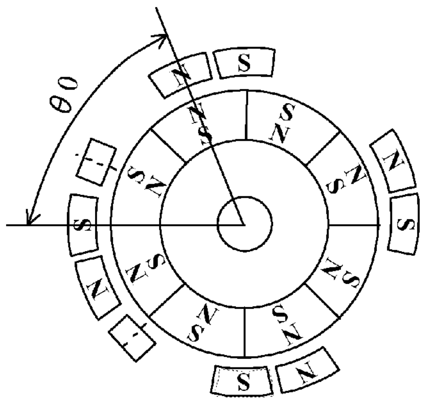

FIG. 6F shows a state after the current application direction for the second coil 204 is switched at a same rotational position of the rotor 202 as that shown in FIG. 6E. The positive directional current is applied to the second coil 204, and thereby the second yoke 206 is magnetized to the N-pole. On the other hand, the negative directional current is applied to the first coil 203, and thereby the first yoke 205 is magnetized to the S-pole. Thus, as shown at (d) in FIG. 4A, a positive torque shown by the torque curve A−B+ acts on the rotor 202, and thereby the rotor 202 is rotated in the clockwise direction in FIG. 6F.

Repeating the above operations enables continuous rotation of the rotor 202 in one direction. Inverting the positive and negative of the binary signal A or B enables rotation of the rotor 202 in a reverse direction.

Figure 7A:
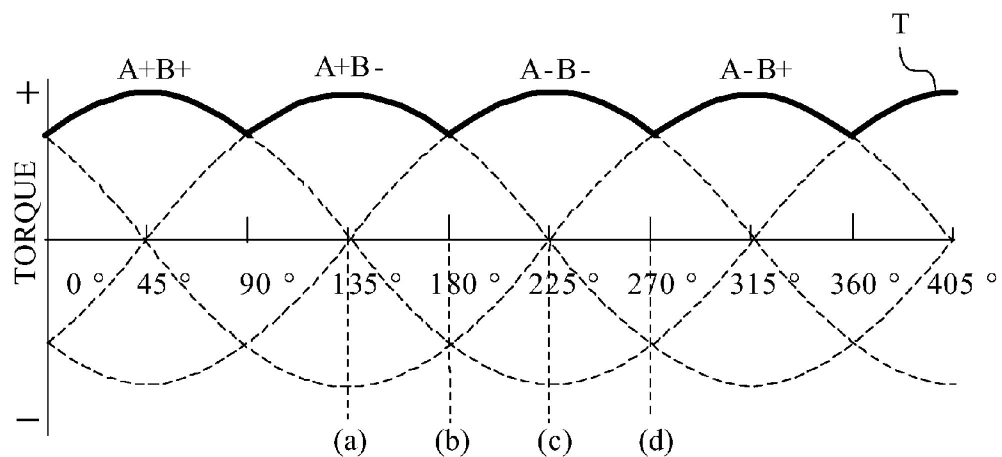
FIG. 7A shows a relationship between the rotor position and the motor torque when a lead angle signal output from the lead angle circuit has a predetermined lead angle $\alpha$ in Embodiment 1.
Figure 7B:
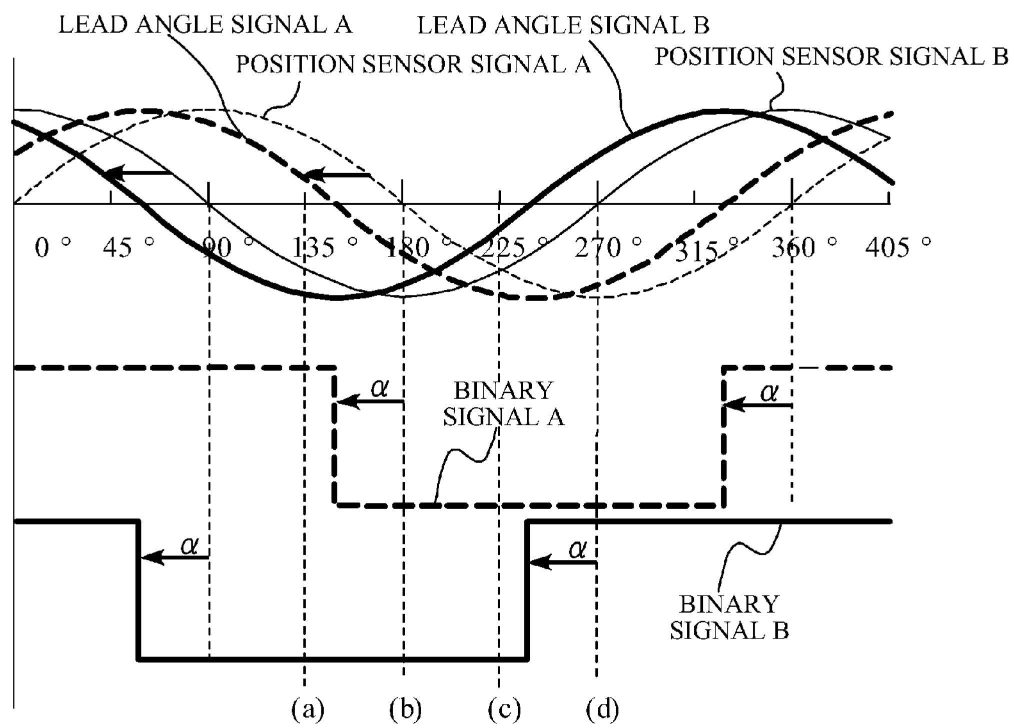
FIG. 7B shows a relationship between the rotor position and respective signal values when the lead angle signal has the predetermined lead angle $\alpha$ in Embodiment 1.

Next, description will be made of operations in the FB drive when the lead angle signals output from the lead angle circuit have a lead angle α. FIG. 7A shows a relationship between the rotational position (rotational angle) of the rotor 202 and the motor torque T when the lead angle signals have the lead angle α. In FIG. 7A, a horizontal axis shows the electrical angle, and a vertical axis shows the motor torque T. FIG. 7B shows a relationship between the rotational position of the rotor 202 and the respective signal values when the lead angle signals have the lead angle α. In FIG. 7B, a horizontal axis shows the electrical angle, and a vertical axis shows the respective signal values.

As shown in FIG. 7B, the lead angle signal A advances by the lead angle α with respect to the position sensor signal A. Also, the lead angle signal B advances by the lead angle α with respect to the position sensor signal B. Furthermore, the binary signals A and B produced based on the lead angle signals A and B respectively advance by the lead angle α with respect to the position sensor signals A and B.

Since the FB drive switches the energization state of the first coil 203 on the basis of the binary signal A and switches the energization state of the second coil 204 on the basis of the binary signal B, a switching timing of the energization state of each coil is earlier by the lead angle α than the case where the lead angle is 0°.

Figure 8:
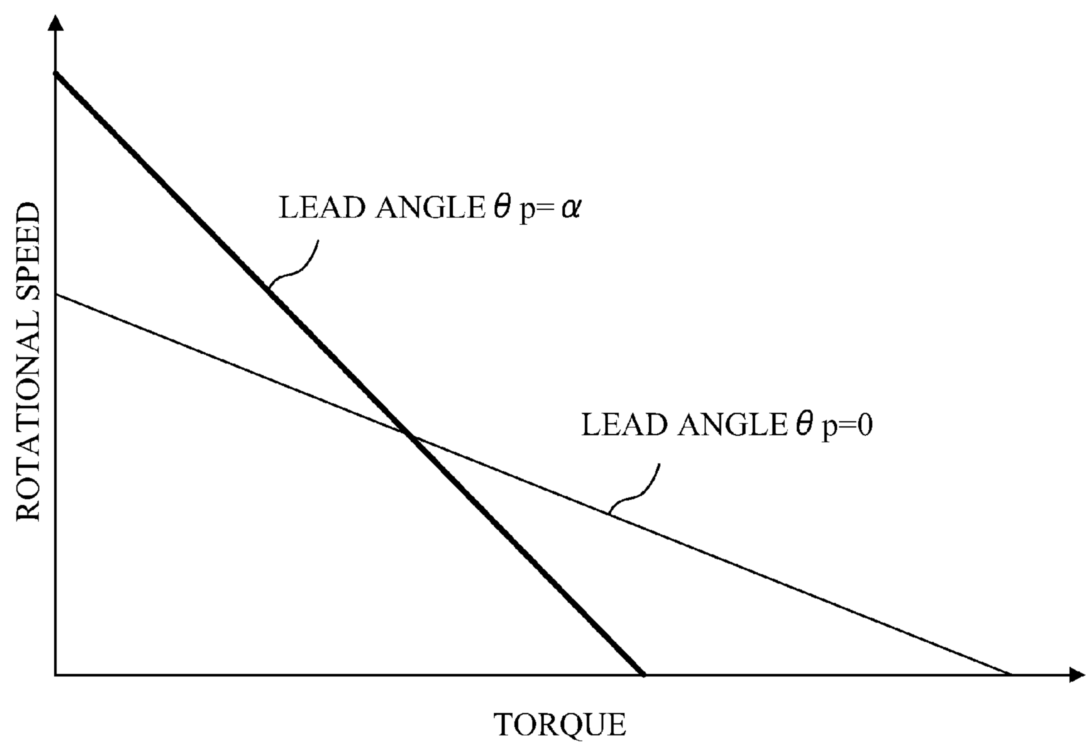
FIG. 8 shows a relationship between the motor torque and motor rotational speed when the lead angle is changed in Embodiment 1.

FIG. 8 shows relationships between the motor torque and the rotational speed of the motor 101 (motor rotational speed) when the lead angle is changed. A horizontal axis shows the motor torque, and a vertical axis shows the motor rotational speed. As understood from this figure, the motor 101 has a characteristic in which the relationship between the motor torque and the motor rotational speed is changed depending on lead angles $\theta_p$ (0 and α). The FB drive performs, by using this characteristic, lead angle control that changes the lead angle depending on a drive condition. In a case where the FB drive is performed under a condition that a load acting on the motor 101 is constant, controlling the lead angle also enables control of the driving speed.

Next, description will be made of control from a start (activation) of the drive of the motor 101 to a target position according to a magnitude of the load acting on the motor 101. Controlling the drive of the motor 101 by combining the OP drive and the FB drive enables the motor 101 to stop at the target position with accuracy equivalent to that in a case of using the normal stepping motor, and further enables the motor 101 to reach the target position faster than the case of using the normal stepping motor. In addition, changing an acceleration pattern (predetermined acceleration pattern) in the OP drive and a driving speed (predetermined speed) at which switching is made from the OP drive to the FB drive according to the magnitude of the load acting on the motor 101 enables good drive of the motor 101 at an appropriate driving speed according to the magnitude of the load. Detailed description thereof will hereinafter be made.

Figure 9A:
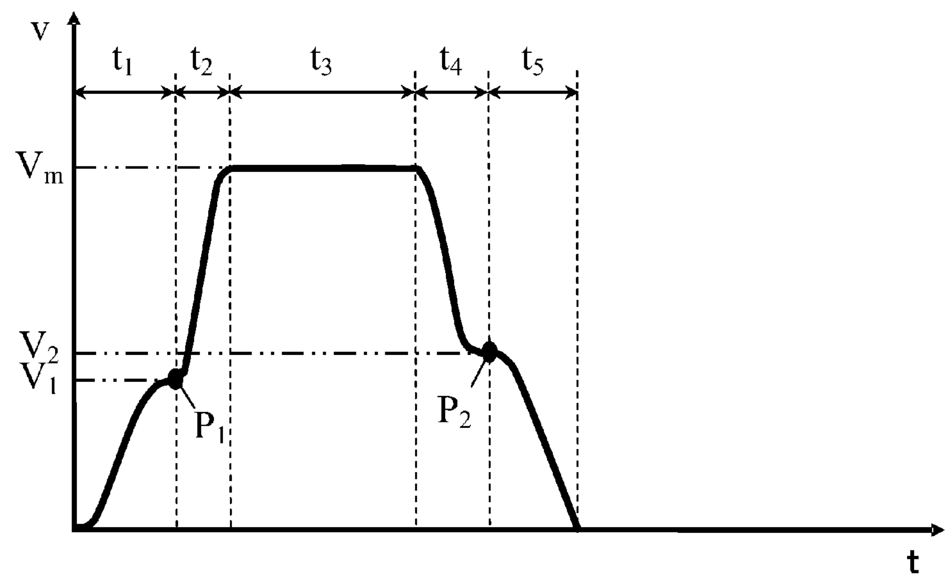
FIGS. 9A and 9B are speed diagrams corresponding to motor load in Embodiment 1.
Figure 9B:
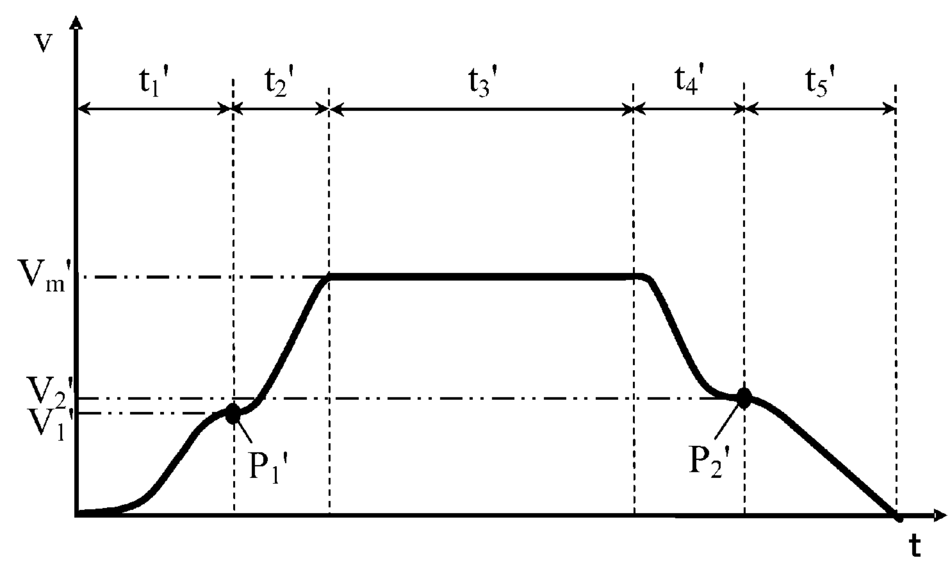

FIGS. 9A and 9B show control examples of the driving speed of the motor 101 according to the load acting on the motor 101. The control example shown in FIG. 9A is for a case where the load is low, and the control example shown in FIG. 9B is for a case where the load is high. In these figures, a horizontal axis shows driving time, and a vertical axis shows the driving speed of the motor 101 or of a driven member (not shown) to be driven by the motor 101. A period $t_1$ and a period $t_2$ are acceleration periods, and a period $t_3$ is a period where the driving speed is maintained at a constant speed Vcm. Moreover, a period $t_4$ and a period $t_5$ are deceleration periods. In addition, the period $t_1$ is the acceleration period in the OP drive, and the period $t_2$ is the acceleration period in the FB drive. The period $t_4$ is the deceleration period in the FB drive, and the period $t_5$ is the deceleration period in the OP drive.

A point $P_1$ is a switching point from the OP drive to the FB drive, and a point $P_2$ is a switching point from the FB drive to the OP drive. The motor controller 302 switches, in acceleration drive, the OP drive to the FB drive in response to increase of the driving speed to a first predetermined speed $V_1$ by the OP drive. On the other hand, the motor controller 302 switches, in deceleration drive, the FB drive to the OP drive in response to decrease of the driving speed to a second predetermined speed $V_2$ by the FB drive. The first and second predetermined speeds $V_1$ and $V_2$ are lower than a speed at which the motor 101 loses steps, and the first predetermined speed $V_1$ is lower than the second predetermined speed $V_2$ ($V_1<V_2$) in this embodiment. Each of the first and second predetermined speeds $V_1$ and $V_2$ is hereinafter also referred to as a "switching speed".

In FIG. 9B, a period $t_1'$ and a period $t_2'$ are acceleration periods, and a period $t_3'$ is a period where the driving speed is maintained at a constant speed Vcm'. A period $t_4'$ and a period $t_5'$ are deceleration periods. Moreover, the period $t_1'$ is the acceleration period in the OP drive, and the period $t_2'$ is the acceleration period in the FB drive. The period $t_4'$ is the deceleration period in the FB drive, and the period $t_5'$ is the deceleration period in the OP drive. A point $P_1'$ is a switching point from the OP drive to the FB drive, and a point $P_2'$ is a switching point from the FB drive to the OP drive. The motor controller 302 switches, in acceleration drive, the OP drive to the FB drive in response to increase of the driving speed to a first predetermined speed $V_1'$ by the OP drive. On the other hand, the motor controller 302 switches, in deceleration drive, the FB drive to the OP drive in response to decrease of the driving speed to a second predetermined speed $V_2'$ by the FB drive. The first and second predetermined speeds $V_1'$ and $V_2'$ are lower than the speed at which the motor 101 loses steps, and the first predetermined speed $V_1'$ is lower than the second predetermined speed $V_2'$ ($V_1'<V_2'$) in this embodiment. Each of the first and second predetermined speeds $V_1'$ and $V_2'$ is hereinafter also referred to as a "switching speed".

A slope of each of graphs of FIGS. 9A and 9B shows an increase rate of the driving speed with respect to the driving time, which is hereinafter referred to as a "speed increase rate".

Comparing FIG. 9A and FIG. 9B, the periods $t_1$ and $T_1'$ that are part of the acceleration period in the OP drive have a difference. Specifically, when the load is high (FIG. 9B), the speed increase rate is lower, that is, an acceleration pattern by which acceleration is gentler than those when the load is low (FIG. 9A). That is, $t_1<t_1'$.

This is because performing gentle acceleration drive with a large torque at a low speed enables the motor 101 to be stably accelerated without losing steps.

On the other hand, when the load is low (FIG. 9A), the speed increase rate is higher, that is, an acceleration pattern by which acceleration is performed more rapidly than those when the load is high (FIG. 9B). This is because, since a necessary torque for the low load is small, even performing rapid acceleration drive enables normal drive of the motor 101. This enables the switching to the FB drive as early as possible without losing steps, which makes it possible to shorten an acceleration time so as to reduce a necessary time for reaching the target position.

Furthermore, comparing FIG. 9A and FIG. 9B, the points $P_1$ and $P_1'$ that are the switching points from the OP drive to the FB drive have a difference. Specifically, when the load is high (FIG. 9B), the switching speed (first predetermined speed) $V_1'$ at the switching point $P_1'$ is lower than the switching speed (first predetermined speed) $V_1$ at the switching point $P_1$ when the load is low (FIG. 9A) ($V_1'<V_1$). This is because a driving speed causing the motor 101 to lose steps when the load is high is lower than that when the load is low. Such setting of the switching speed enables stable switching to the FB drive without losing steps.

Thus, this embodiment changes the acceleration pattern in the OP drive and the switching speed at which the OP drive is switched to the FB drive depending on the magnitude of the load acting on the motor, which enables motor drive according to situation of the load.

There are various methods for setting a reference acceleration pattern and a reference switching speed, which is necessary for changing the acceleration pattern and the switching speed depending on the magnitude of the load. For example, there is a method that uses, as the reference acceleration pattern and the reference switching speed, an acceleration pattern and a switching speed for driving the motor 101 in a load range (corresponding to a predetermined value, and hereinafter referred to as a "reference load range") supposed at a normal temperature.

In this method, when a load higher than the reference load range acts on the motor 101, the acceleration pattern to be used is changed to an acceleration pattern in which the speed increase rate is lower than that in the reference acceleration pattern, and the switching speed to be used is changed to a switching speed lower than the reference switching speed. In other words, when the magnitude of the load is higher than the reference load range, the speed increase rate of the motor 101 in the acceleration pattern to be used and the switching speed to be used are made lower than those when the magnitude of the load is lower than the reference load range.

Moreover, when only a load lower than the reference load range acts on the motor 101, the acceleration pattern to be used is changed to an acceleration pattern in which the speed increase rate is higher than that in the reference acceleration pattern, and the switching speed to be used is changed to a switching speed higher than the reference switching speed. In other words, when the magnitude of the load is lower than the reference load range, the speed increase rate of the motor 101 in the acceleration pattern to be used and the switching speed to be used are made higher than those when the magnitude of the load is higher than the reference load range.

Instead of the above-described example, a method may be employed which uses, as the reference load range, a load range that is supposed at a higher or lower temperature than the normal temperature, and uses, as the reference acceleration pattern and the reference switching speed, an acceleration pattern and a switching speed when driving the motor within the reference load range.

In addition, a method may be employed which uses a certain number of drivings of the motor as a reference number of drivings, and changes, when an actual number of drivings exceeds the reference number of drivings, the acceleration pattern to be used to an acceleration pattern in which the speed increase rate is lower than that in the reference acceleration pattern and further changes the switching speed to be used to a switching speed lower than the reference switching speed.

There are the following methods for setting (changing) the acceleration pattern to be used. One of the methods prestores plural acceleration patterns whose speed increase rates and switching speeds are mutually different in a memory (not shown) provided in the motor controller 302, and causes the motor controller 302 to select one acceleration pattern and one switching speed from the memory depending on the magnitude of the load. Moreover, another method may be used which causes the motor controller 302 to calculate and set the acceleration pattern and the switching speed as needed depending on the magnitude of the load.

There are the following example cases where the load is high and low. First, there are a case where the magnitude of the load is known beforehand and a case where the magnitude of the load is unknown beforehand.

As the case where the magnitude of the load is known beforehand, there is a case where a design load is known in a driven area where the driven member is driven by the motor 101. For example, in a cam to drive a lens barrel (driven member) of a camera outward and inward, there are a cam area where a load for driving the lens barrel is high and a cam area where the load is low. Moreover, according to a posture of an apparatus including the driven member, the magnitude of the load for driving the driven member is varied due to an influence of a self weight of the driven member. Furthermore, when a friction generated in a sliding part of the driven member or a viscosity of a lubricant applied thereto is changed depending on temperature, the magnitude of the load for driving the driven member is varied. In addition, in a transmission mechanism that transmits a rotational force of the motor to the driven member via a reducer, when a motor rotational direction (driving direction) is reversed, presence or absence of backlash varies the load (the absence of the backlash increases the load).

Thus, in the cases where the magnitude of the load is varied depending on the driven area of the motor or the driven member, the posture of the apparatus, the temperature and the driving direction, the acceleration pattern and the switching speed may be changed according to these parameters. Moreover, in a case where the magnitude of the load is varied depending on a cumulative value of driving amounts of the motor or the driven member, the acceleration pattern and the switching speed may be changed according to that driving amount cumulative value.

On the other hand, as the case where the load is unknown beforehand, there is a case where, for example, the driven member receives disturbance that temporarily and unexpectedly increases the load. Furthermore, there is a case where friction in a sliding part of the motor or the driven member is varied with the number of drivings or due to a change with time. In this case, the state of the sliding part changes depending on usage environment and a driving condition, which may permanently increase the load from an initial state.

In such cases where the unexpected load is generated due to the disturbance and the load is increased from the initial state of the apparatus, the acceleration pattern and the switching speed can be changed according to the load that is detected. The detection of the load can be performed by, for example, monitoring a relationship between a voltage application timing for activating the motor 101 in the OP drive and the outputs from the position detection element 407 or an output from an element that detects a movement amount of the driven member. For example, the magnification of the load can be estimated based on a delay time from a rising edge timing of the applied voltage at the time of the activation in the OP drive to a timing at which the a predetermined movement amount of the rotor 202 or the driven member is detected by the position detection elements 407 or the element that detects the movement amount of the driven member. The delay time increases as the load increases, and the delay time decreases as the load decreases.

Therefore, if the delay time is within a predetermined time range, a determination is made that the load is low, and an acceleration pattern in which the speed increase rate is high is used in the OP drive and the switching to the FB drive is performed at a higher switching speed than that when the load is high. On the other hand, if the delay time is longer than the predetermined time range, a determination is made that the load is high, and an acceleration pattern in which the speed increase rate is low is used in the OP drive and the switching to the FB drive is performed at a lower switching speed than that when the load is low.

As described above, this embodiment changes the acceleration pattern for the OP drive and the switching speed from the OP drive to the FB drive, depending on the magnitude of the load acting on the motor 101. This can realize a stable acceleration drive of the motor 101 when the load is high, and can further realize a higher speed acceleration drive of the motor 101 at a higher speed when the load is low.

However, the relationship between the magnitude of the load and the speed increase rate in the acceleration pattern is not limited to the above-described one, and may be arbitrary selected according to apparatuses, such as optical apparatuses, using the motor driving apparatus.

Embodiment 2

Figure 12A:
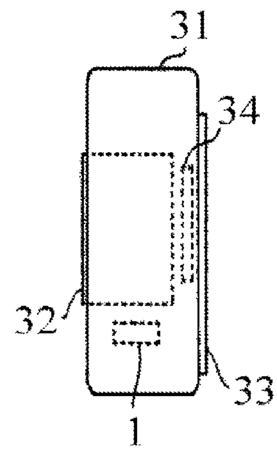
FIGS. 12A to 12C are side views of an image pickup apparatus that is Embodiment 2 of the present invention.
Figure 12B:
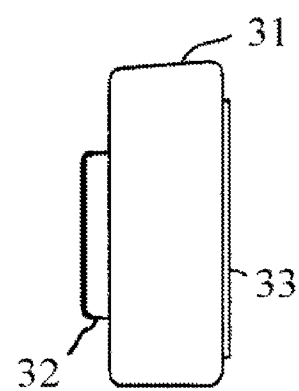
Figure 12C:
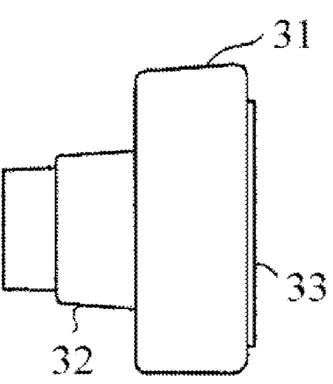
Figure 13:
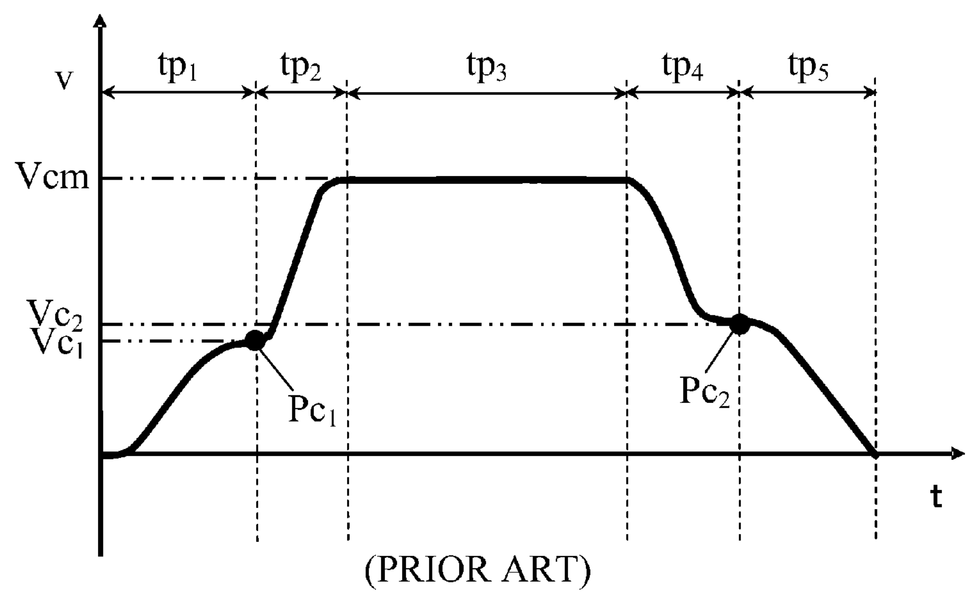
FIG. 13 shows an example of a conventional control method performed by combining open-loop control and feedback control.

FIGS. 12A to 12C show an image pickup apparatus (digital camera) as an optical apparatus including the motor driving apparatus described in Embodiment 1.

FIG. 12A shows a state where a zoom lens barrel 32 is retracted in a main body 31 of the image pickup apparatus. This position of the zoom lens barrel 32 is referred to a "retracted position". FIG. 12B shows a state where the zoom lens barrel 32 is protruded from the retracted position with respect to the main body 31. This position of the zoom lens barrel 32 is referred to an "image pickup standby position", which is a wide-angle end position in this embodiment. FIG. 12C shows a state where the zoom lens barrel 32 is further protruded than the wide-angle end position (image pickup standby position) with respect to the main body 31 to a telephoto end position.

Reference numeral 34 denotes an image sensor (image pickup element) such as a CCD sensor or a CMOS sensor. Reference numeral 33 denotes a display part constituted by a liquid crystal monitor or the like and provided on a back face of the main body 31.

In response to power-on of the image pickup apparatus from its power-off state, the zoom lens barrel 32 is driven from the retracted position to the wide-angle end position by a driving force from the motor 1 corresponding to the motor 101 described in Embodiment 1. This drive is referred to as "standby drive". Then, in response to an operation of a zoom switch (not shown) by a user, the zoom lens barrel 32 is driven so as to be extended and shortened to an image pickup position between the wide-angle end position and the telephoto end position. Moreover, in response to power-off of the image pickup apparatus from its power-on state, the zoom lens barrel 32 is driven from the image pickup position to the retracted position by the driving force from the motor 1.

In the zoom lens barrel 32, a cam barrel (not shown) is rotated by the driving force from the motor 1, and thereby a cam formed in the cam barrel drives the zoom lens barrel 32 such that it is extended or shortened, and moves a lens (not shown). The extending and shortening drive (zoom drive) of the zoom lens barrel 32 between the wide-angle end position and the telephoto end position is performed by such a cam mechanism.

In the above-mentioned cam mechanism, in a cam area between the retracted position and a position near the wide-angle end position, a slope angle of the cam with respect to a rotational direction of the cam barrel is small. In this cam area, an extending/shortening amount of the zoom lens barrel 32 is small, and therefore the load of the motor 1 is low. On the other hand, in a cam area between the wide-angle end position and the telephoto end position, the slope angle of the cam with respect to the rotational direction of the cam barrel is large. In this cam area, the extending/shortening amount of the zoom lens barrel 32 is large, and therefore the load of the motor 1 is high.

In the case of employing such a cam mechanism, it is desirable to use, between the retracted position and the wide-angle end position, an acceleration pattern in which the speed increase rate is higher than the reference acceleration pattern and a switching speed higher than the reference switching speed. On the other hand, it is desirable to use, between the wide-angle end position and the telephoto end position, an acceleration pattern in which the speed increase rate is lower than the reference acceleration pattern and a switching speed lower than the reference switching speed.

Thus, changing the acceleration pattern for the OP drive and the switching speed to the FB drive enables fast standby drive in response to the power-on and enables smooth zoom drive.

Although this embodiment has described the case where the motor driving apparatus of Embodiment 1 is used for the drive of the lens barrel of the image pickup apparatus, the motor driving apparatus of Embodiment 1 and alternative embodiments of the present invention can be used for drive of a driven member other than the lens barrel in the image pickup apparatus or a driven member of an optical apparatus other than image pickup apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-192651, filed on Aug. 30, 2010 which is hereby incorporated by reference herein in its entirety.

What is claimed is:

1. A driving apparatus comprising:
a motor configured to drive a driven member, the motor including:
a rotor having a cylindrical magnet whose outer circumferential surface is magnetized;
a first yoke having a first magnetic pole portion which faces the outer circumferential surface of the cylindrical magnet;
a second yoke having a second magnetic pole portion which faces the outer circumferential surface of the cylindrical magnet;
a first coil configured to magnetize the first magnetic pole portion;
a second coil configured to magnetize the second magnetic pole portion;
a position detector configured to detect rotation position of the rotor;
an open-loop driver configured to switch an energization state of the first coil and second coil at a predetermined time interval;
a feedback driver configured to switch an energization state of the first coil and the second coil according to an output of the position detector; and
a controller configured to switch the open-loop driver and the feedback driver at a predetermined driving speed,
wherein the controller changes the predetermined driving speed according to the magnitude of the load acting on the motor.

2. A driving apparatus according to claim 1,
wherein if the magnitude of the load acting on the motor is higher than a reference load range, the predetermined driving speed is lower than a reference driving speed, and
wherein if the magnitude of the load acting on the motor is lower than a reference load range, the predetermined driving speed is higher than a reference driving speed.

3. A driving apparatus according to claim 1,
wherein the open-loop driver accelerates the motor in a predetermined acceleration pattern,
wherein the controller changes the predetermined acceleration pattern according to the magnitude of the load acting on the motor.

4. A driving apparatus according to claim 3,
wherein if the magnitude of the load acting on the motor is higher than a reference load range, speed increase rate of the predetermined acceleration pattern is lower than speed increase rate of the reference acceleration pattern, and
wherein if the magnitude of the load acting on the motor is lower than a reference load range, speed increase rate of the predetermined acceleration pattern is higher than speed increase rate of the reference acceleration pattern.

5. A driving apparatus according to claim 1,
wherein the magnitude of the load acting on the motor is varied depending on a driven area of the motor or the driven member.

6. A driving apparatus according to claim 1,
wherein the magnitude of the load acting on the motor is varied depending on the posture of the driving apparatus.

7. A driving apparatus according to claim 1,
wherein the magnitude of the load acting on the motor is varied depending on the driving direction of the motor.

8. A driving apparatus according to claim 1,
wherein the magnitude of the load acting on the motor is estimated based on a delay time from a timing at which the open-loop driver switches an energization state of the first coil and second coil to a timing at which the position detector detects rotation of the rotor.

9. An optical apparatus comprising:
a motor configured to drive a lens, the motor including:
a rotor having a cylindrical magnet whose outer circumferential surface is magnetized;
a first yoke having a first magnetic pole portion which faces the outer circumferential surface of the cylindrical magnet;
a second yoke having a second magnetic pole portion which faces the outer circumferential surface of the cylindrical magnet;
a first coil configured to magnetize the first magnetic pole portion;
a second coil configured to magnetize the second magnetic pole portion;
a position detector configured to detect rotation position of the rotor;
an open-loop driver configured to switch an energization state of the first coil and second coil at a predetermined time interval;
a feedback driver configured to switch an energization state of the first coil and the second coil according to an output of the position detector; and
a controller configured to switch the open-loop driver and the feedback driver at a predetermined driving speed,
wherein the controller changes the predetermined driving speed according to the magnitude of the load acting on the motor.

10. An optical apparatus according to claim 9,
wherein if the magnitude of the load acting on the motor is higher than a reference load range, the predetermined driving speed is lower than a reference driving speed, and
wherein if the magnitude of the load acting on the motor is lower than a reference load range, the predetermined driving speed is higher than a reference driving speed.

11. An optical apparatus according to claim 9,
wherein the open-loop driver accelerates the motor in a predetermined acceleration pattern,
wherein the controller changes the predetermined acceleration pattern according to the magnitude of the load acting on the motor.

12. An optical apparatus according to claim 11, wherein if the magnitude of the load acting on the motor is higher than a reference load range, speed increase rate of the predetermined acceleration pattern is lower than speed increase rate of the reference acceleration pattern, and wherein if the magnitude of the load acting on the motor is lower than a reference load range, speed increase rate of the predetermined acceleration pattern is higher than speed increase rate of the reference acceleration pattern.

13. An optical apparatus according to claim 9, wherein the magnitude of the load acting on the motor is varied depending on a driven area of the lens.

* * * * *